Figure 4:
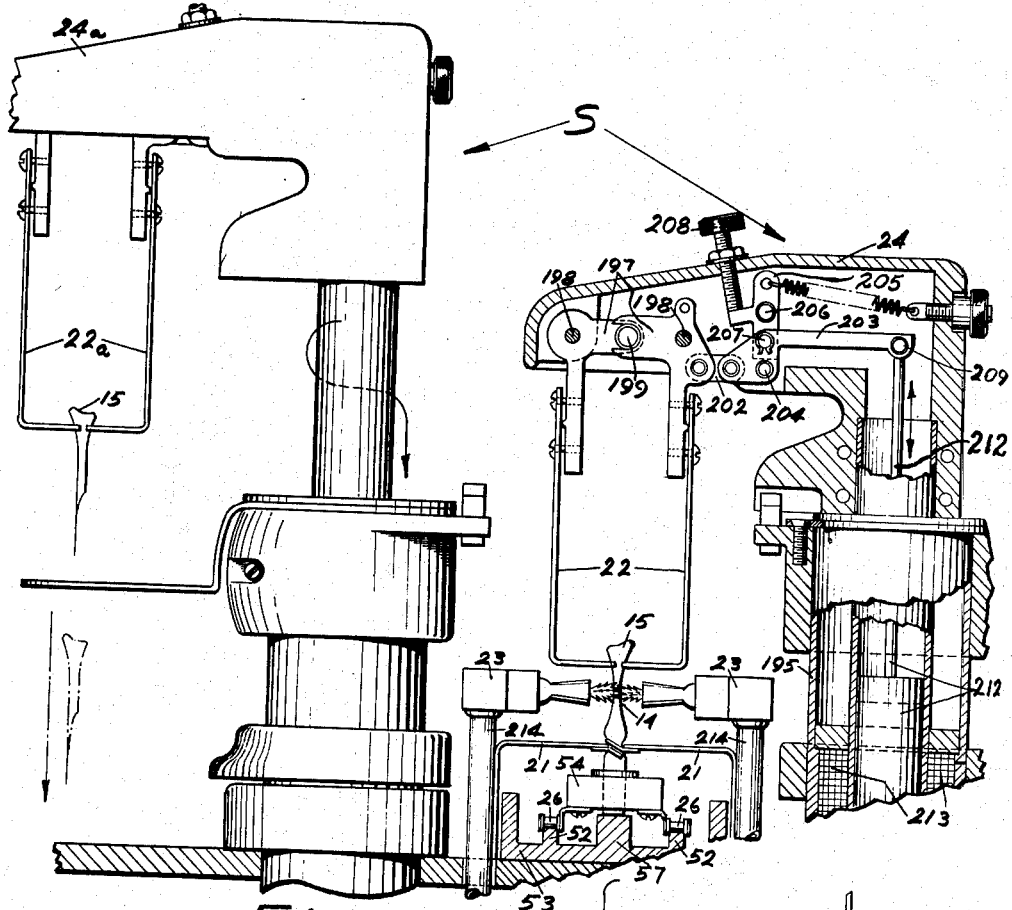

Sept. 21, 1954
C. E. UNGER
2,689,677
AMPOULE FILLING AND SEALING MACHINE
Filed Aug. 14, 1950
13 Sheets-Sheet 1
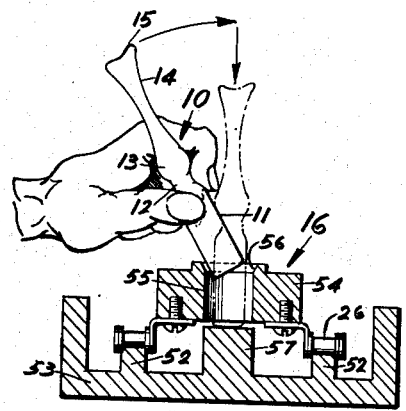
Fig. 1
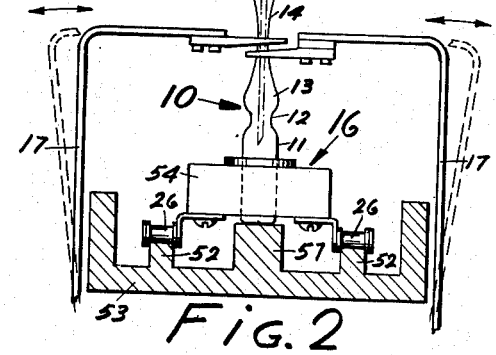
Fig. 2
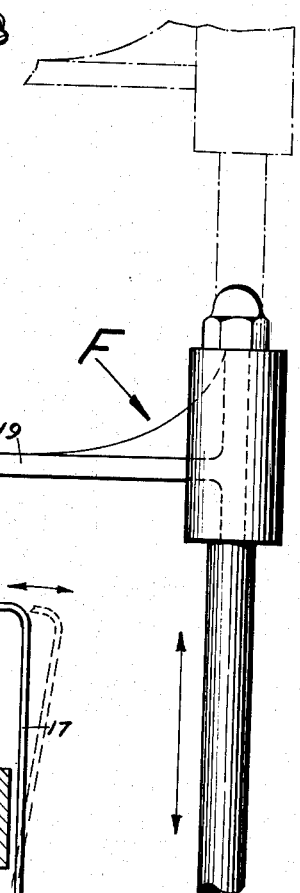
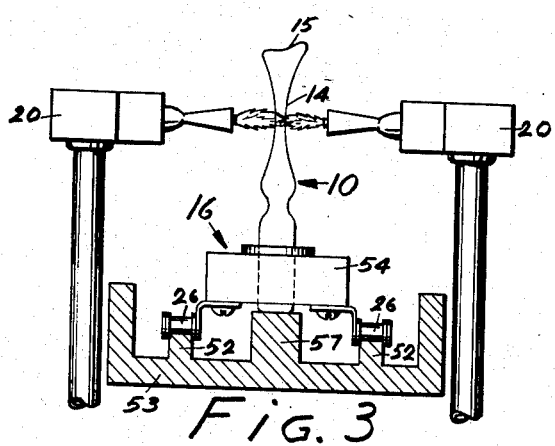
Fig. 3
INVENTOR.
CHESTER E. UNGER
BY Sept. 21, 1954 C. E. UNGER 2,689,677
AMPOULE FILLING AND SEALING MACHINE
Filed Aug. 14, 1950 13 Sheets-Sheet 2

INVENTOR.
CHESTER E. UNGER
BY

Sept. 21, 1954          C. E. UNGER          2,689,677
AMPOULE FILLING AND SEALING MACHINE
Filed Aug. 14, 1950          13 Sheets-Sheet 3

INVENTOR.
CHESTER E. UNGER
BY

Sept. 21, 1954   C. E. UNGER   2,689,677
AMPOULE FILLING AND SEALING MACHINE
Filed Aug. 14, 1950   13 Sheets-Sheet 4
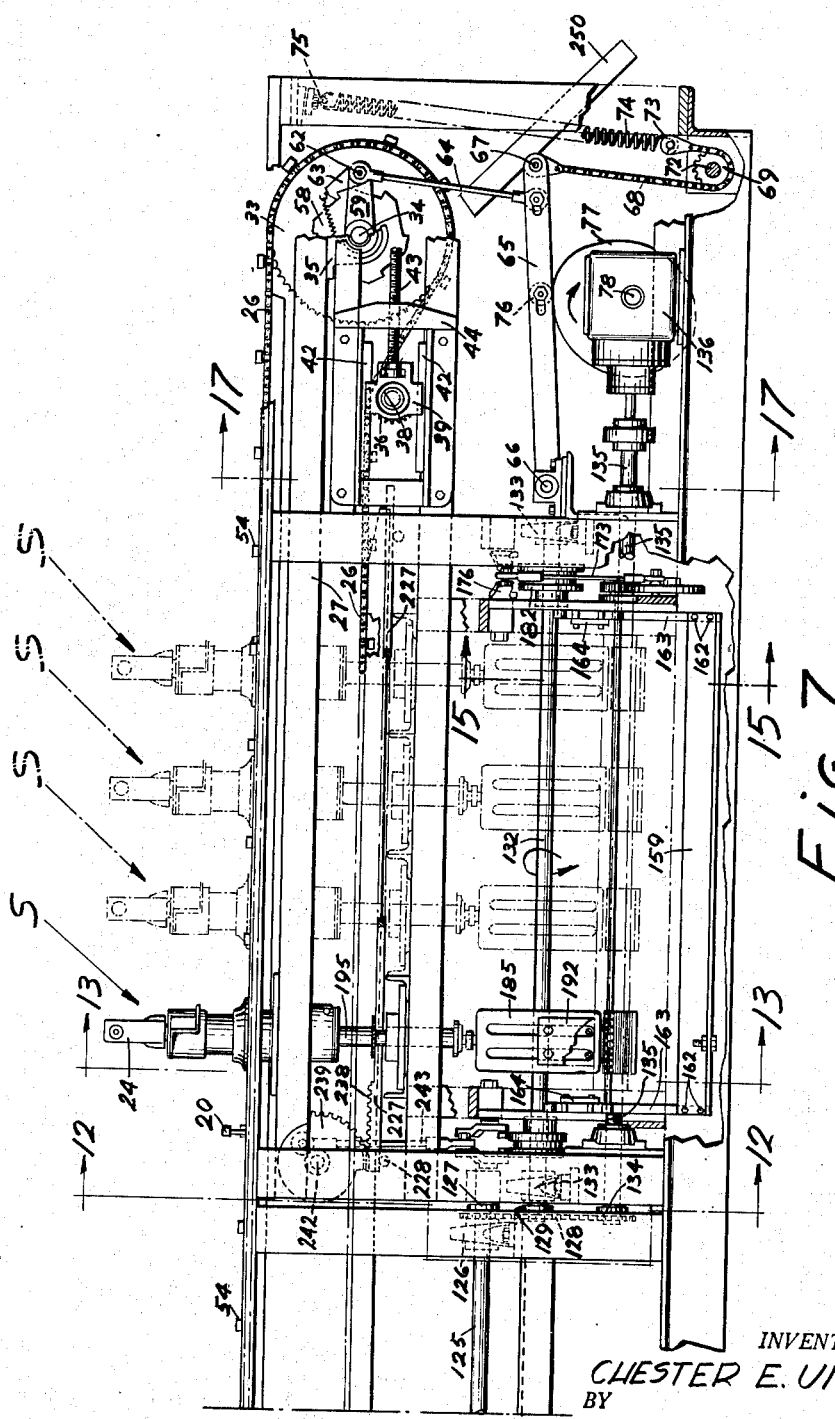
Fig. 7
INVENTOR.
CHESTER E. UNGER
BY

Sept. 21, 1954     C. E. UNGER     2,689,677
AMPOULE FILLING AND SEALING MACHINE
Filed Aug. 14, 1950     13 Sheets-Sheet 5
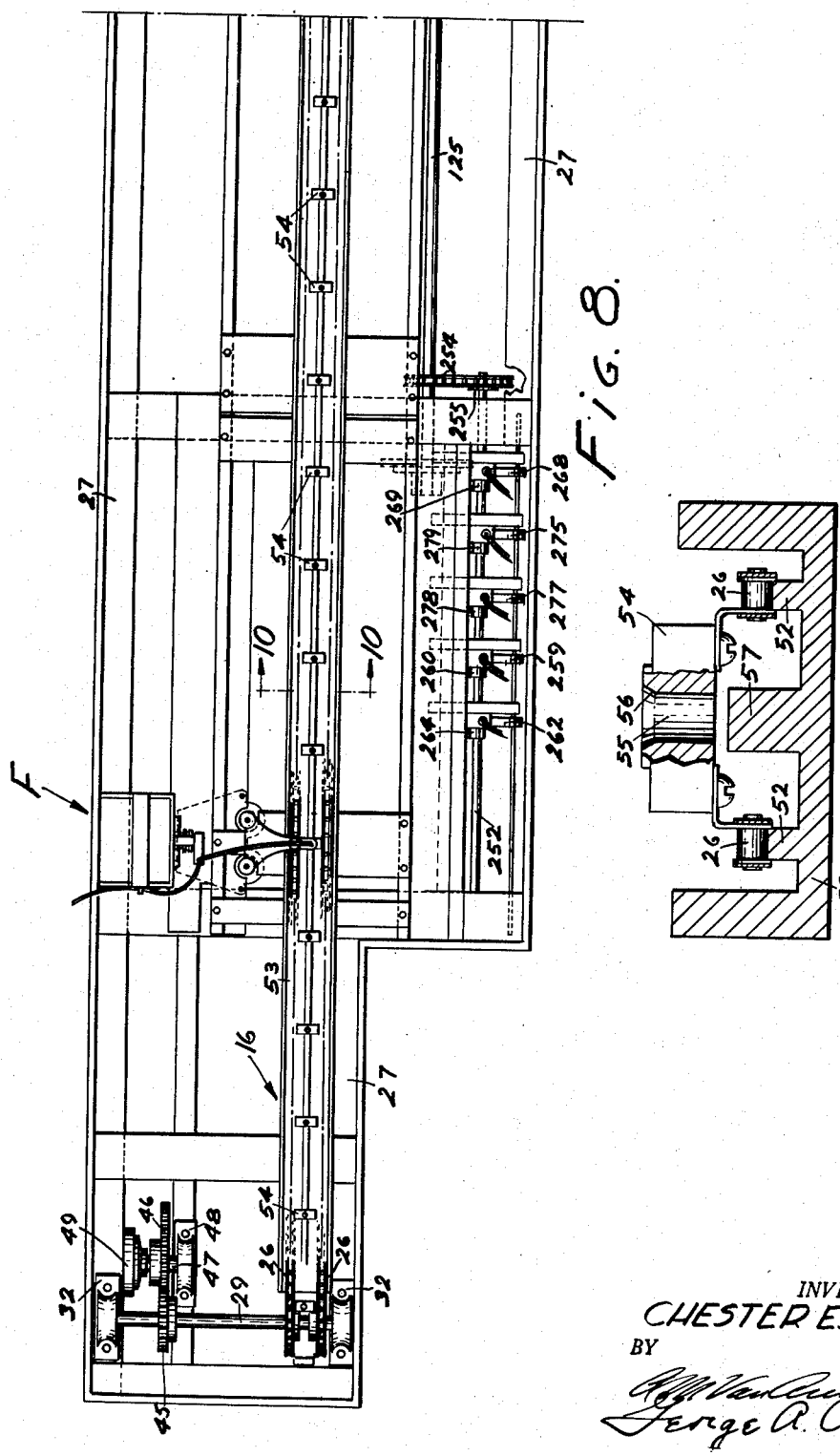
INVENTOR.
CHESTER E. UNGER
BY

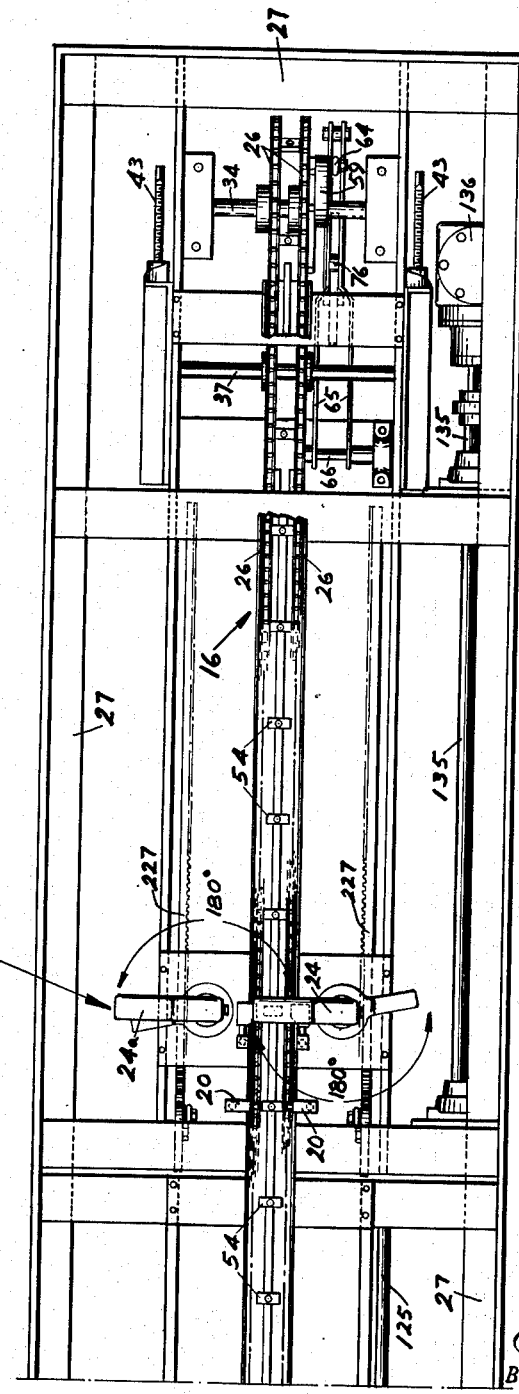

INVENTOR.
CHESTER E. UNGER

Sept. 21, 1954

C. E. UNGER 2,689,677

AMPOULE FILLING AND SEALING MACHINE

Filed Aug. 14, 1950

13 Sheets-Sheet 10

INVENTOR.
CHESTER E. UNGER
BY

Sept. 21, 1954    C. E. UNGER    2,689,677
AMPOULE FILLING AND SEALING MACHINE
Filed Aug. 14, 1950    13 Sheets-Sheet 11

INVENTOR.
CHESTER E. UNGER
BY
George A. Ordway

Sept. 21, 1954    C. E. UNGER    2,689,677
AMPOULE FILLING AND SEALING MACHINE
Filed Aug. 14, 1950    13 Sheets-Sheet 12

INVENTOR.
CHESTER E. UNGER
BY

Sept. 21, 1954  C. E. UNGER  2,689,677
AMPOULE FILLING AND SEALING MACHINE
Filed Aug. 14, 1950  13 Sheets-Sheet 13

INVENTOR.
CHESTER E. UNGER
BY

Patented Sept. 21, 1954

2,689,677

UNITED STATES PATENT OFFICE 2,689,677

AMPOULE FILLING AND SEALING MACHINE

Chester E. Unger, New Carlisle, Ind., assignor to Eli Lilly and Company, Indianapolis, Ind., a corporation of Indiana Application August 14, 1950, Serial No. 179,155

5 Claims. (Cl. 226—75)

This invention relates to a machine for filling and sealing ampoules or the like.

It is an object of the invention to provide an ampoule filling and sealing machine which is adapted to fill and seal ampoules in a continuous, rapid mass production manner.

Another object of the invention is to provide a machine of this character which utilizes a simple, straight line or rectilinear mode of operation whereby all of the operations upon the ampoules may be constantly and conveniently under the surveillance of a single operator.

A further object is to provide automatically operable means for preventing operation of certain filling mechanisms of the machine under conditions where no ampoule is present to be filled.

A still further object is to provide in a machine of this character a sealing mechanism operable under the control of the particular ampoule being sealed and in accordance with its peculiar wall thickness and strength characteristics.

With these and incidental objects in view, the invention includes certain novel features of construction and combinations of parts, the essential elements of which are set forth in appended claims, and a preferred embodiment of which is hereinafter described with reference to the drawings which accompany and form part of the specification.

Figure 5:
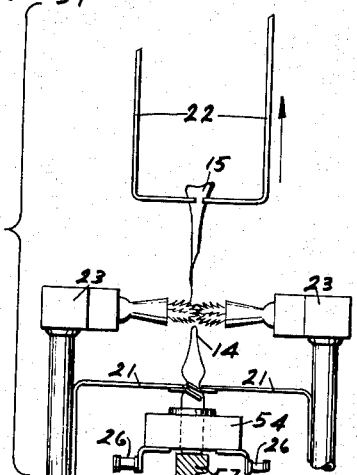
Figure 6:
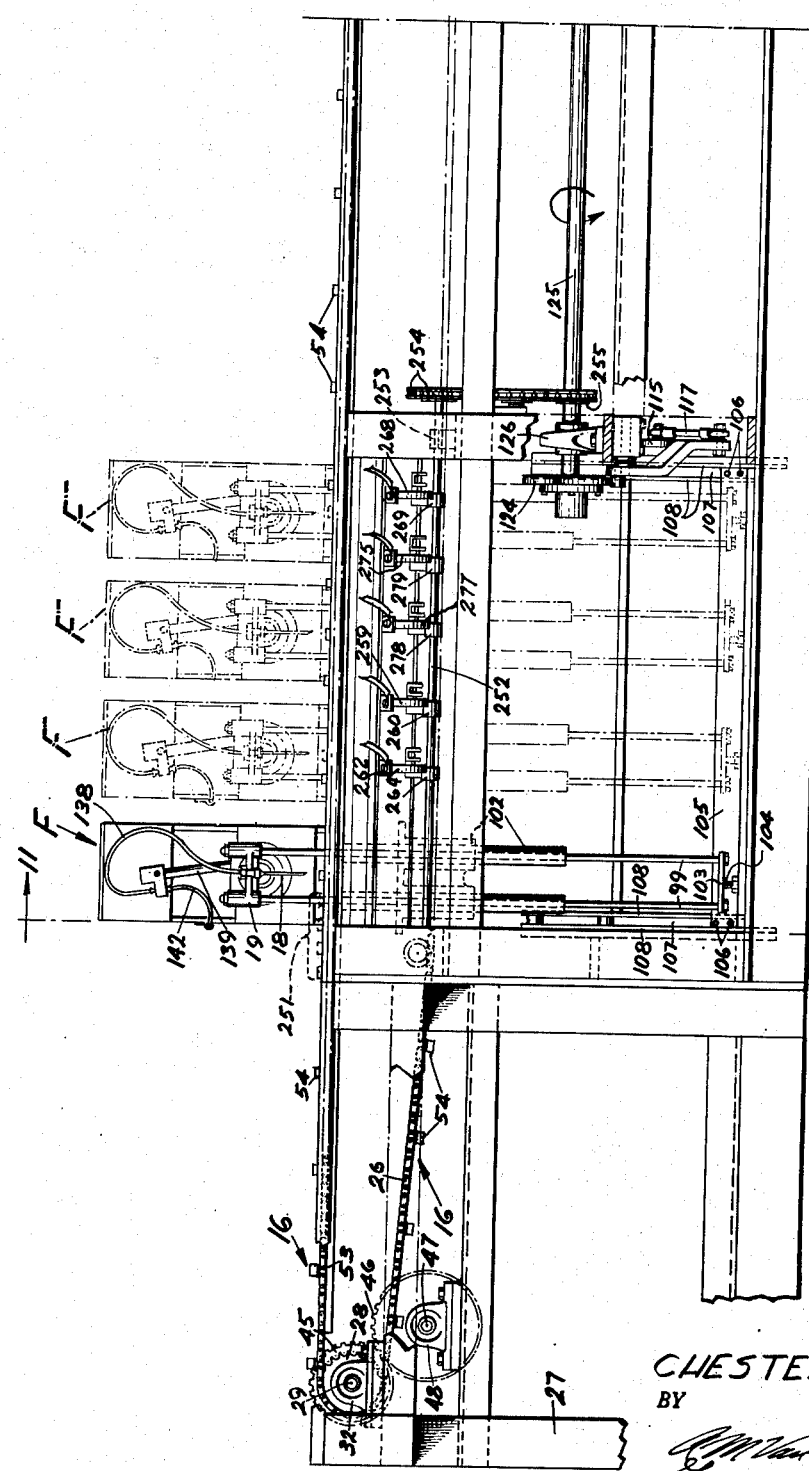
Figure 11:
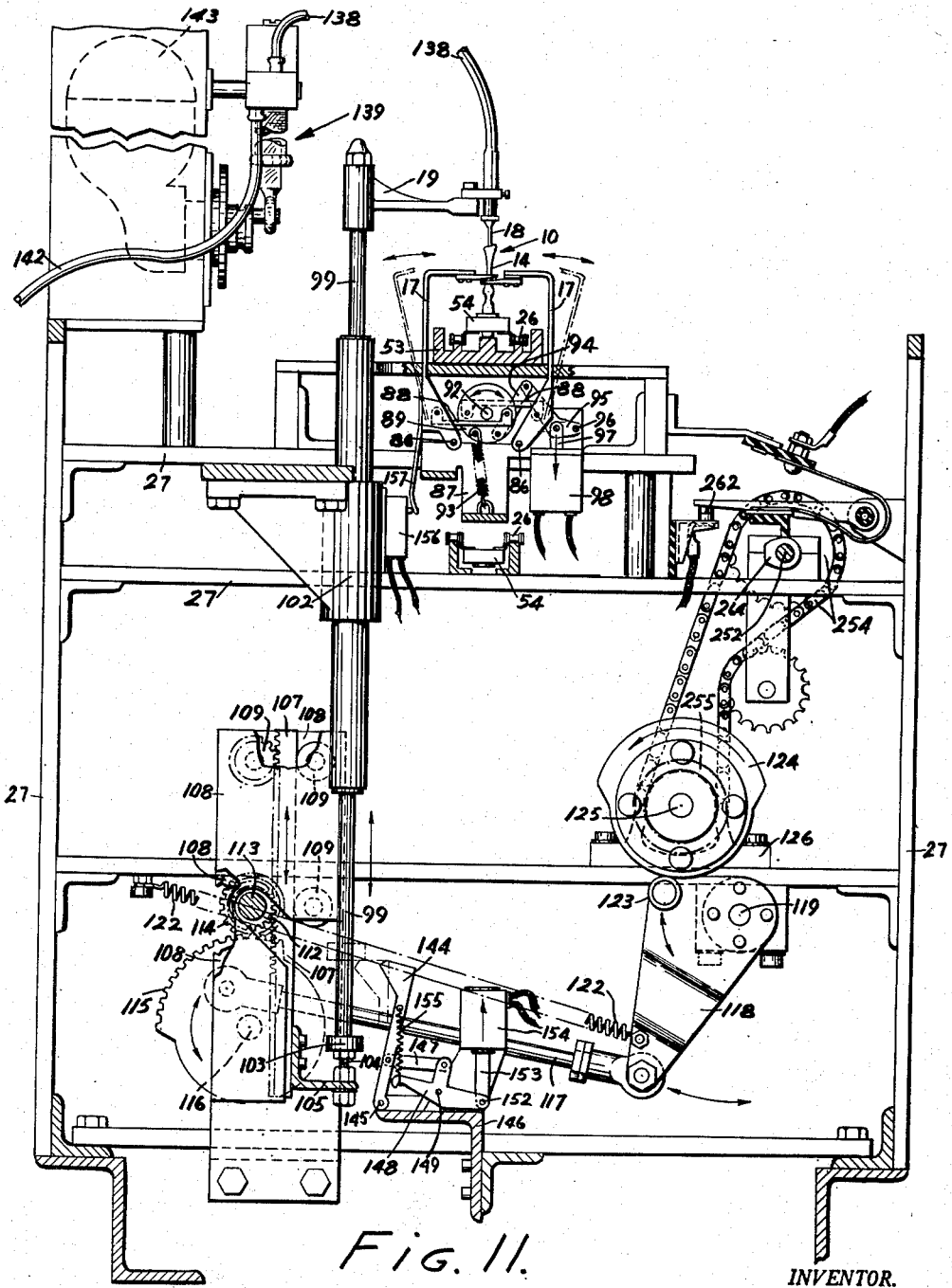
Figure 12:
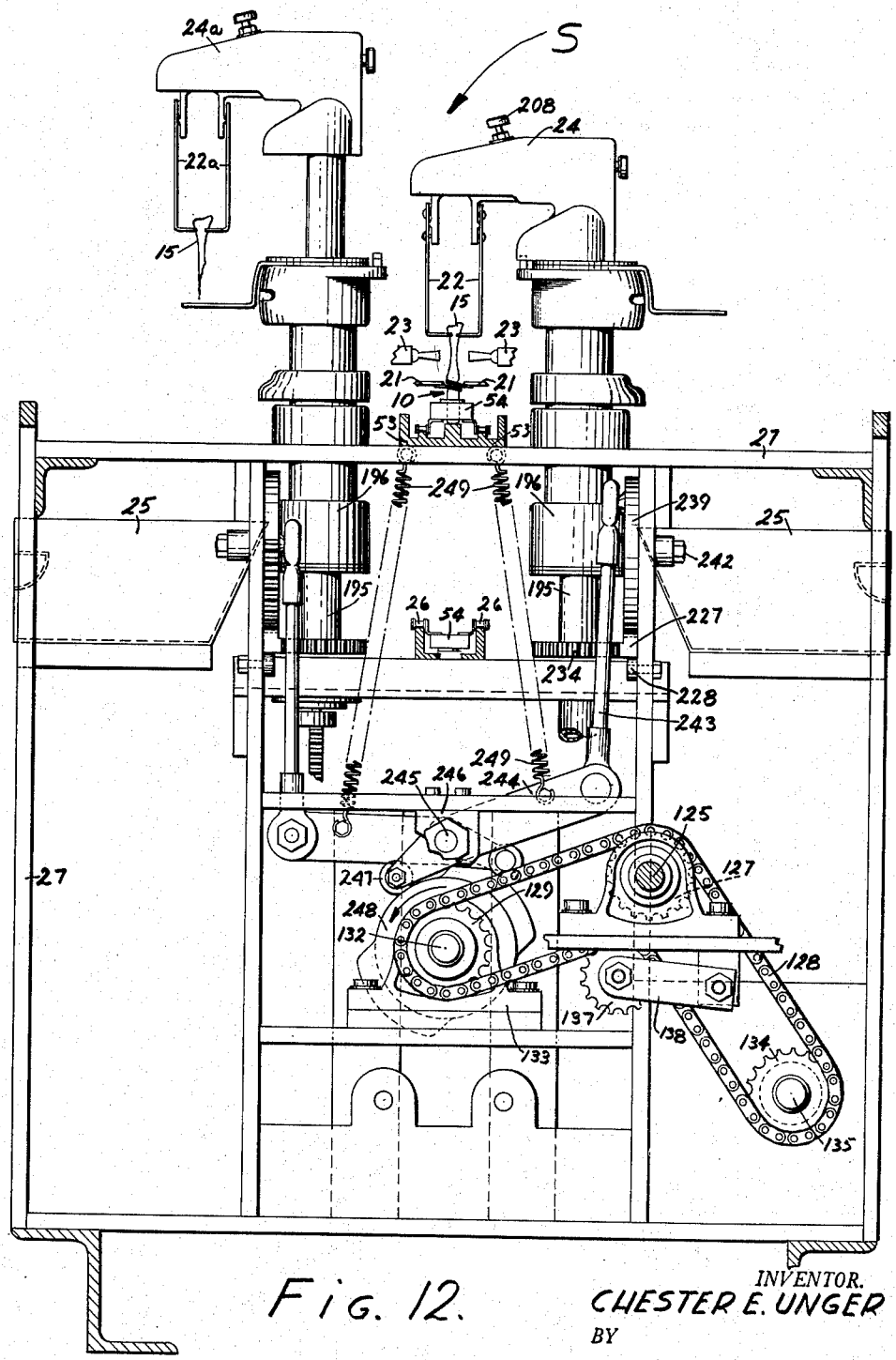
Figure 13:
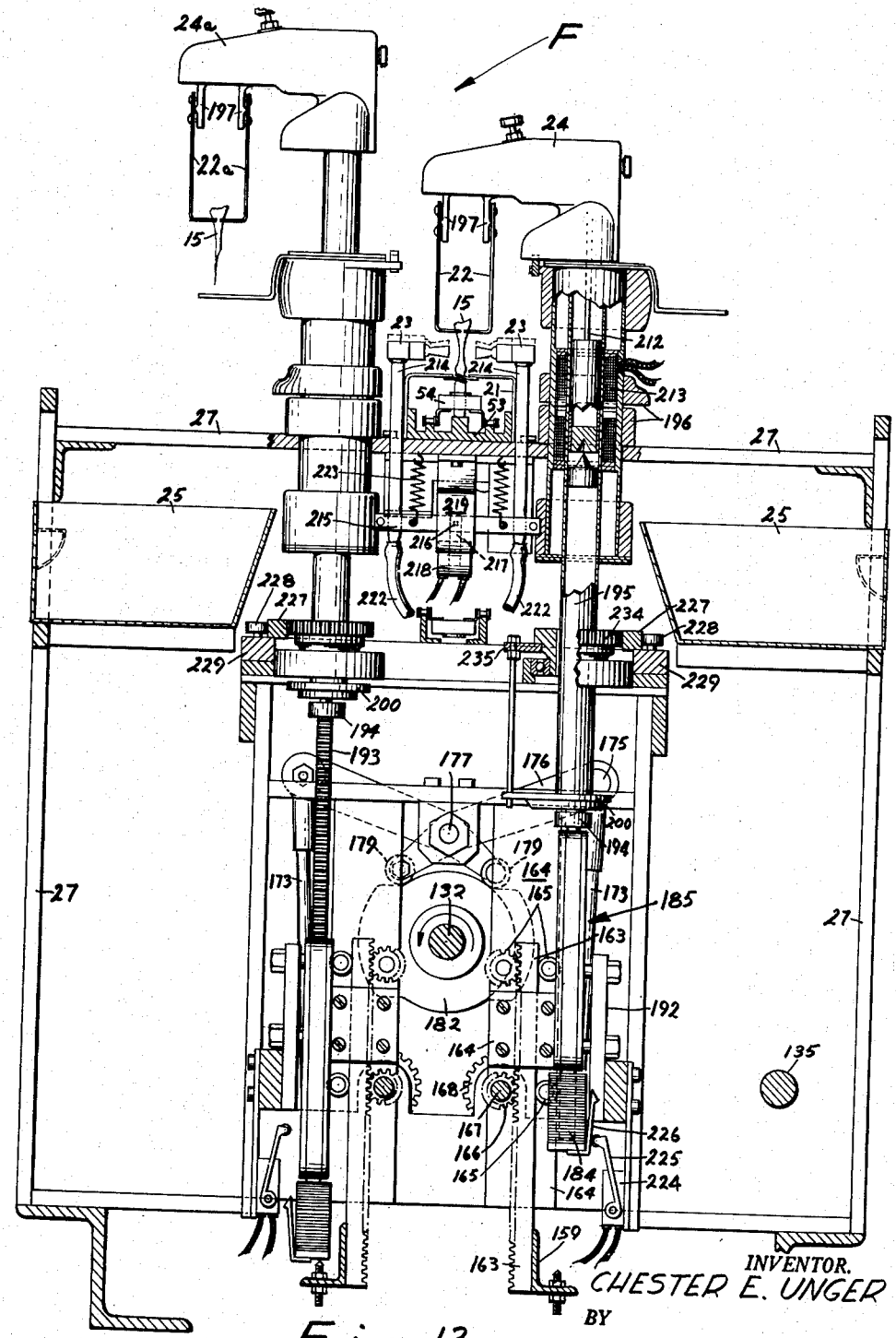
Figure 14:
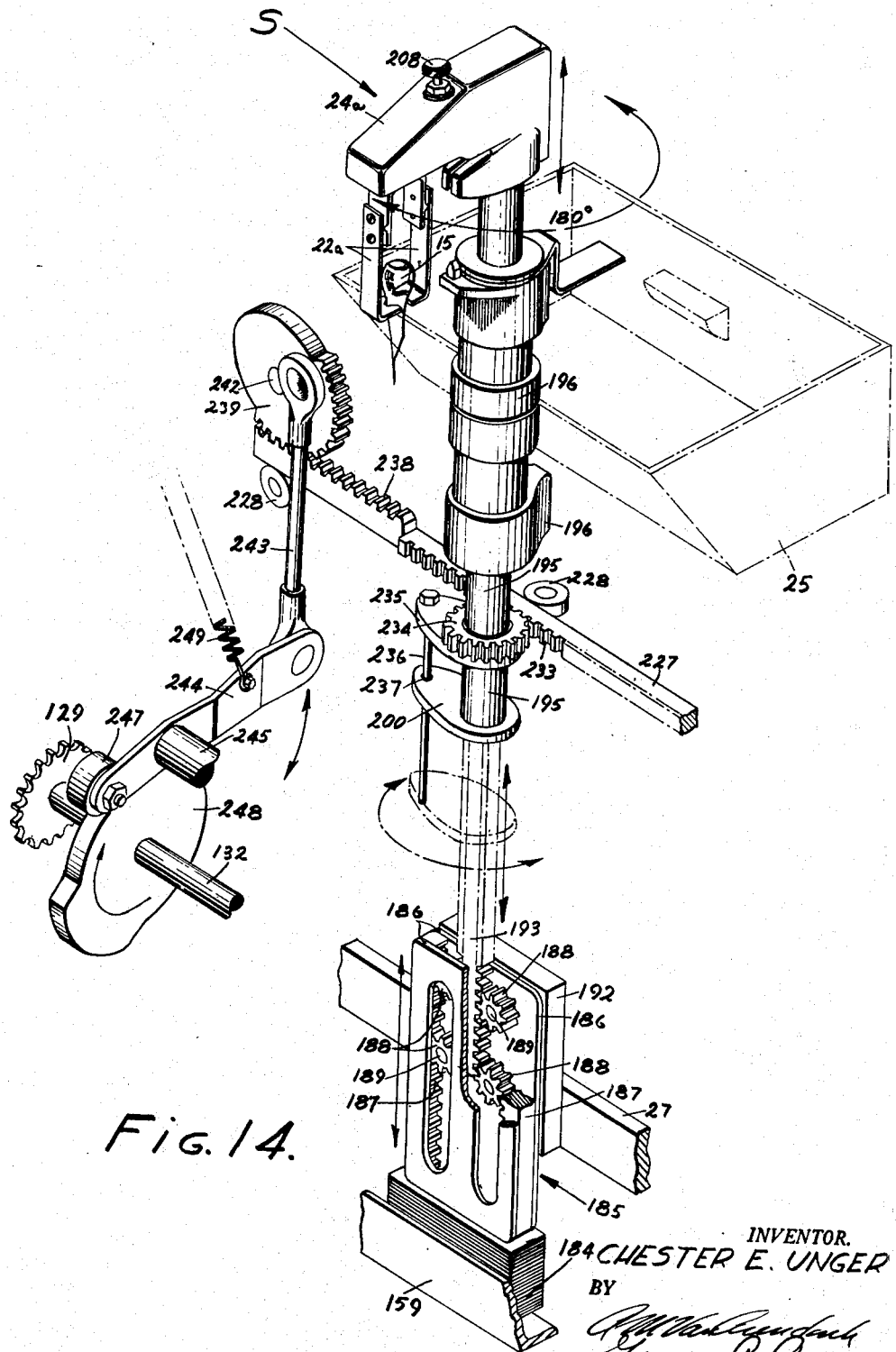
Figure 15:
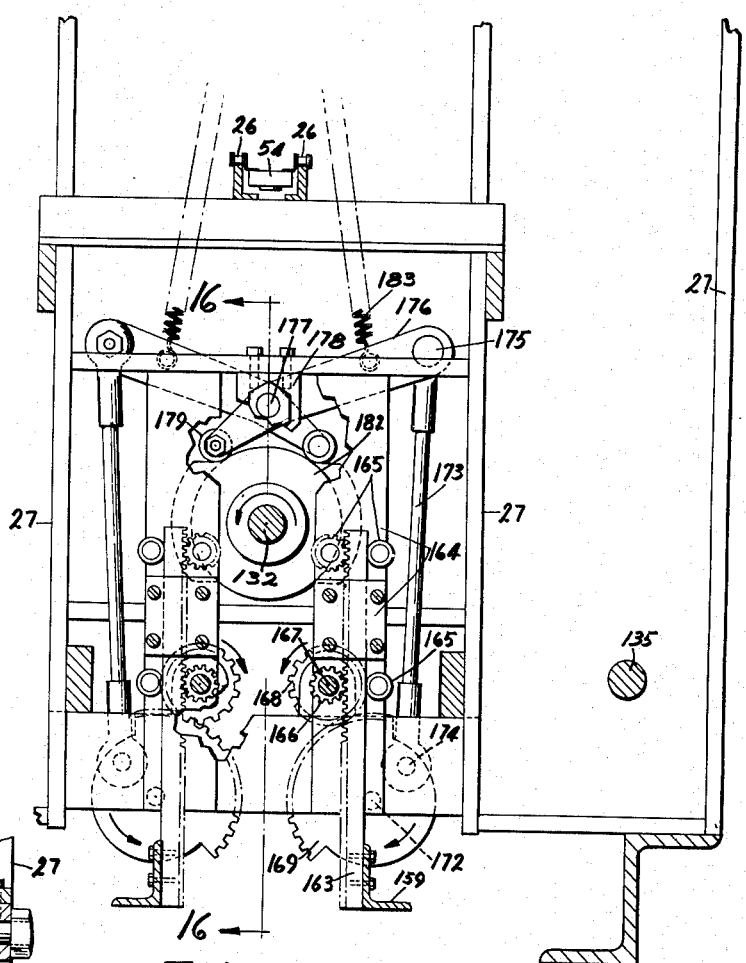
Figure 16:
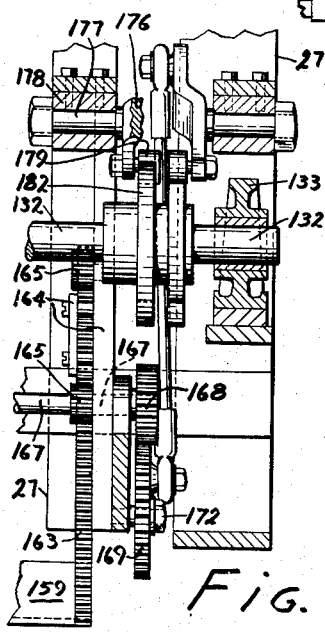
Figure 17:
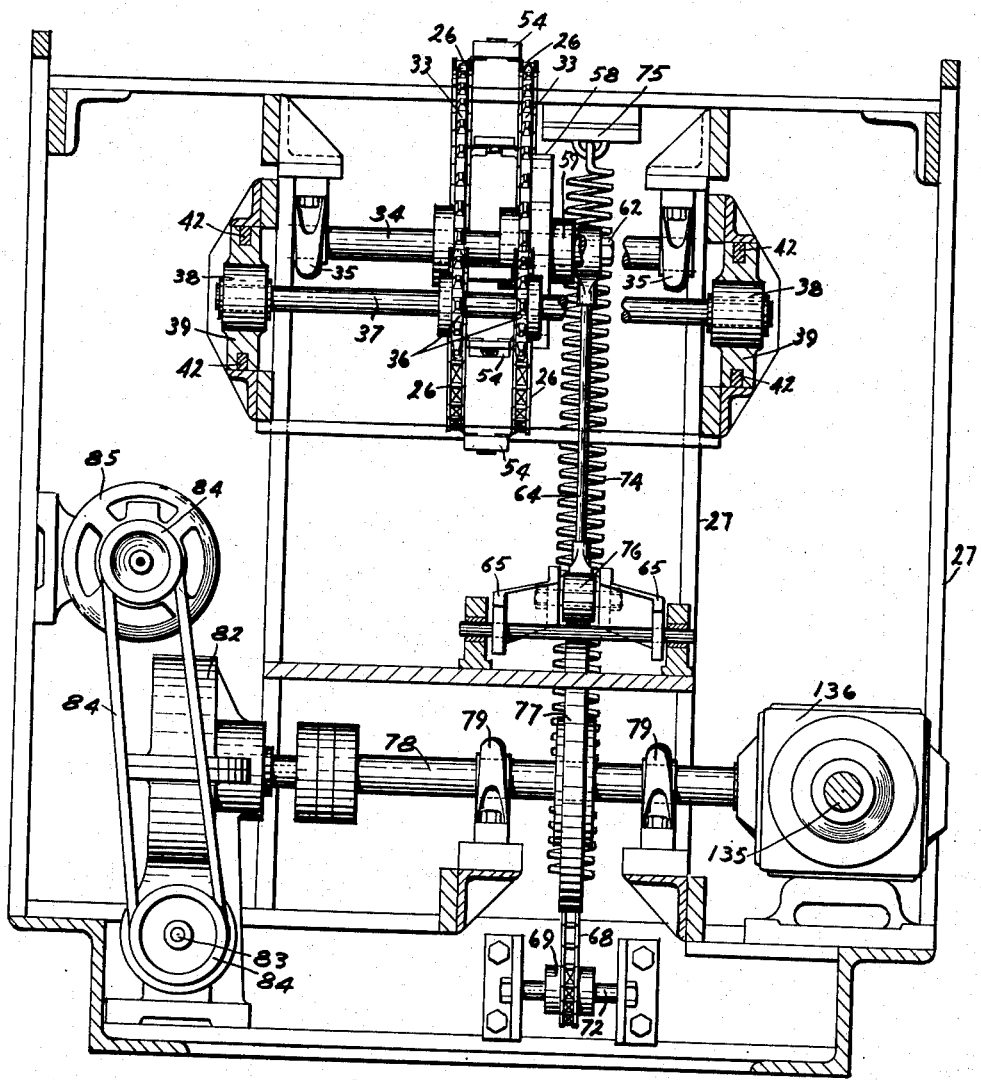
Figure 18:
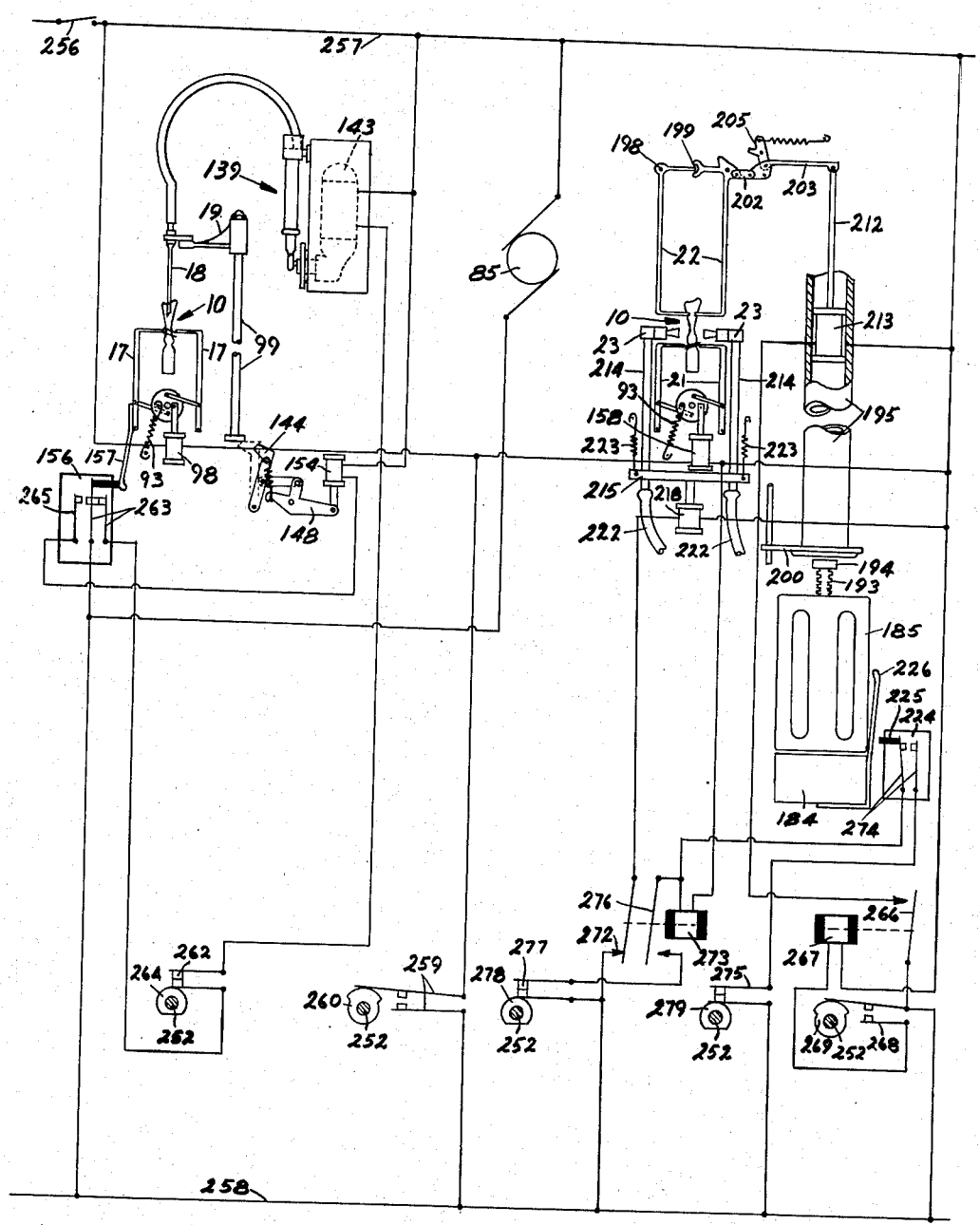

In the drawings:

Figs. 1 to 5, inclusive, are fragmental views illustrating the several operations of the machine, Figs. 6 and 7, taken together, constitute a side elevation of the complete machine, Figs. 8 and 9, taken together, constitute a top plan view thereof, Fig. 10 is a detailed sectional elevation taken along the line 10—10 of Fig. 8, Fig. 11 is a sectional elevation taken along the line 11—11 of Fig. 6, Fig. 12 is a sectional elevation taken along the line 12—12 of Fig. 7, Fig. 13 is a sectional elevation taken along the line 13—13 of Fig. 7, Fig. 14 is a perspective view of a portion of an ampoule sealing unit shown in Fig. 13 and shows certain of the mechanisms associated therewith, Fig. 15 is a sectional elevation taken along the line 15—15 of Fig. 7, Fig. 16 is a sectional elevation taken substantially along the line 16—16 of Fig. 15, Fig. 17 is a sectional elevation taken along the line 17—17 of Fig. 7, and Fig. 18 is a wiring diagram showing the electrical circuits for the entire machine, the ampoule filling and sealing mechanisms being shown in diagrammatic form.

Index of topics

1. The machine operations generally
2. Ampoule conveyor and indexing mechanism
3. Ampoule filling mechanism
4. Ampoule filling lockout mechanism
5. Ampoule sealing mechanism
6. Electrical circuits.

1. The machine operations generally

Referring to Figs. 1–3, there is indicated generally, at 10, an ampoule which is representative of the type which may be filled and sealed on the present machine. The ampoule 10 includes a body 11, constricted portion or constriction 12, bulb 13, neck 14, which latter tapers upwardly and outwardly and merges into a waste or scag end 15.

The ampoules 10 are inserted in suitable receptacles provided on a conveyor indicated generally at 16 which carries the ampoules first, to a filling station indicated at F in Figs. 2 and 6. Referring to Fig. 2, at filling station F, a pair of aligning grippers 17 embrace the neck 14 of the ampoule to coaxially align its opening with a needle 18 carried by a filling head 19. Filling head 19 is arranged to be lowered as shown in Fig. 2 to lower needle 18 into neck 14 of the ampoule. Needle 18 is connected with a suitable supply source for ejecting a medicament or other liquid into the ampoule in a precision dose quantity. Following the filling operation, head 19 is raised to withdraw needle 18 to a position where its lower end lies above the upper end of the ampoule, aligning grippers 17 are released from engagement with neck 14 and conveyor 16 is advanced to index a filled ampoule into sealing position at a sealing station generally indicated at S in Figs. 4 and 7. During the movement of the ampoule toward sealing station S, neck 14 passes through oppositely disposed flames jetting from preheat burners 20 as shown in Figs. 3 and 7, to preheat the neck preparatory to the ampoule entering sealing station S.

Referring now particularly to Fig. 4, upon the ampoule arriving at sealing position, anchoring grippers 21 close to embrace constriction 12 and anchor the ampoule against upward movement. Pulling tongs 22 are lowered and closed as shown in Fig. 4 to embrace the scag end 15 just above neck 14 and oppositely disposed flames from sealing burners 23 project toward and surround the neck to plasticize the glass or other material from which the ampoule is made, the flames from the sealing burners, at this time, being in the same horizontal plane as the flames of preheat burners 20. Tongs 22 pivotally depend from a vertically movable and rotatable sealing head 24 which, as will hereinafter appear, is arranged to be raised by associated weight mechanism as soon as the glass or other material from which the ampoule is made has been rendered sufficiently plastic by the flames jetting from sealing burners 23 to permit the associated weight mechanism to impart such raising movement. Upon head 24 raising, scag end 15 is pulled upwardly by tongs 22 as shown in Fig. 5 and the fused end effects a sealing of the neck 14 of the ampoule as shown in this figure. Substantially, concurrently with the separation of scag end 15, burners 23 are elevated slightly for a short period of time to lift their associated flames from the position shown in Fig. 4 to the position shown in Fig. 5 where they play upon the sharp, pointed end that is left incident to the separation of scag end 15 from neck 14. This causes the sharp, pointed end to remain molten and flow into a smooth, rounded knob at the tip of neck 14 and thus completes the sealing operation.

Following such sealing operation, grippers 21 release constriction 12 and conveyor 16 concurrently moves the sealed ampoule out of sealing position, a filled ampoule out of filling position, and an unfilled and filled ampoule, respectively, into filling and sealing positions. The filled ampoule during such movement passes through the flames of preheating burners 20 and comes to rest in alignment with anchoring grippers 21 and a pair of pulling tongs 22a of a sealing head 24a companion to head 24 and oppositely disposed thereto. Head 24a, at this time, will have been swung from the position shown in Fig. 4 to a position where its pulling tongs 22a, are in alignment with grippers 21. During the conveyor indexing movement just described, the scag end 15 just removed from a sealed ampoule by tongs 22 is swung by head 24 through an arc of 180° to a position over a suitable waste receptacle such as 25 whereupon tongs 22 open to release the scag end into the receptacle while head 24a and pulling tongs 22a lower and close upon scag end 15 of the ampoule just advanced into sealing position. Following the release of a scag end 15 by sealing head 24, this head with its tongs 22 maintained in open position, returns to its original position shown in Fig. 4 in alignment with grippers 21 during the next conveyor indexing operation while head 24a and tongs 22a swing through a 180° arc to release the scag end which they have just pulled from an ampoule, and so on. Sealed ampoules are carried by conveyor 16 from sealing station S to a position where they fall into a suitable collecting container.

Since all of the operations are carried on in a straight line manner, each is openly visible to a single operator seated at the forward end of the machine in position to insert the ampoules in the conveyor. Such straight line mode of operation makes it simple and convenient to add a number of filling stations F and sealing stations S as suggested in dotted lines in Figs. 6 and 7 adjacent the filling and sealing stations shown in full lines in these figures. In this manner the machine's production capacity may be increased or decreased in accordance with prevailing requirements. The filling and sealing operations are as readily carried on simultaneously upon groups of ampoules as upon single ampoules and the rectilinear path of operation facilitates the surveillance by the operator of the multiple groups of filling and sealing stations and the operations therein performed.

2. *Ampoule conveyor and indexing mechanism*

Referring to Figs. 6 and 7, conveyor 16 comprises a pair of relatively closely spaced, endless chains 26 extending parallel to one another for the full length of the machine frame 27. At the forward end of the machine (left end as viewed in Fig. 6) chains 26 pass around a pair of sprockets such as 28 fixed to a horizontally disposed shaft 29 journaled at its opposite ends in bearings 32, secured on the upper surface of machine frame 27. At the rear end of the machine (right end as viewed in Fig. 7) chains 26 pass around a pair of relatively larger sprockets 33 (see also Fig. 17) affixed on a horizontally disposed shaft 34 journaled at its opposite ends in bearings 35 secured to machine frame 27. The lower stretch of the chain passes over a pair of suitably spaced idler sprockets 36 affixed to a horizontally disposed shaft 37 journaled at its opposite ends in bearings 38 provided in a carriage 39 slidably mounted on ways 42 secured to the machine frame. Adjusting screws 43 (see also Fig. 9) threadably mounted in a stationary member 44, and having a rotative connection with carriage 39, provide means for moving carriage 39 and idler sprockets 36 forwardly or rearwardly of the machine to place the desired degree of tension upon chains 26. At the forward end of the machine (see Figs. 6 and 8) a gear 45 affixed to shaft 29 meshes with a gear 46 fixed on a horizontally disposed shaft 47 journaled in bearings such as 48 on the machine frame. Shaft 47 is connected with a magnetic brake or the like, indicated at 49, and by this means, the upper stretch of conveyor chains 26 are maintained taut between sprockets 28 and 33. It will be understood that any suitable brake or drag producing means may be utilized to accomplish this maintenance of proper tension upon the upper stretch of the chains.

Referring to Fig. 10 it will be seen that these upper stretches of chains 26 slidably pass over upwardly extending tracks 52 formed on a bedplate 53, which extends from the forward end of the machine from a point adjacent sprockets 28 to the rear end of the machine to a point adjacent sprockets 33, tracks 52 serving to guide the chains as they pass thereover. Ampoule receiving blocks or receptacles 54 are mounted tranversely between the chains at uniform spaced points throughout the entire lengths thereof. Centrally of each receptacle 54 is a bore 55 of a diameter such as will receive an ampoule 10 with ample clearance for its easy insertion and removal. The upper end of the bore is chamfered or bevelled as at 56, to facilitate the insertion of an ampoule therein as illustrated in Fig. 1. The lower surfaces of receptacles 54 lie a slight distance above the upper surface of an upstanding track 57 formed centrally of, integrally and co-extensive in length with, bedplate 53. Track 57 serves as a support for the bottoms of ampoules 10 when the ampoules are inserted within bore 55 as clearly shown in Fig. 1. The means for imparting movement to conveyor 16, and thus indexing receptacles 54, with the ampoules carried therein to filling station F and sealing station S, includes a ratchet wheel 58 (Figs. 7 and 17) affixed to shaft 34 adjacent the right hand sprocket 33 as viewed in Fig. 17. An arm 59 (Fig. 7) loosely mounted on shaft 34, has pivoted at its outer end as at 62, a spring-pulled pawl 63. Arm 59 is pivotally connected by a link 64 to a pair of horizontally disposed levers 65. The forward ends of levers 65 are journaled on a horizontally disposed shaft 66 suitably mounted on the machine frame. The rearward ends of the levers are connected by a transversely disposed stud 67 secured to one end of a chain 68 passing around an idler gear 69, fixed on a shaft 72 suitably journaled in the machine frame as shown in Fig. 17. The opposite end of chain 68 is connected as at 73 (Fig. 7) to one end of a heavy coil spring 74, the opposite end of which is anchored as at 75 to the machine frame.

A roller 76 rotatably mounted between levers 65 bears against the edge of a cam 77 fixed to a horizontally disposed shaft 78 and is maintained constantly in following contact with said cam edge under the tension of spring 74.

Shaft 78 is journaled for rotation in bearings 79 (Fig. 17) fixed to the machine frame. As will be seen in Fig. 17, the left end of shaft 78 passes into gear housing 82 and connects through worm and worm gears (not shown) which are driven in rotation by a shaft 83 connected by belt and pulley connections 84 with an electric motor 85, the latter being the main drive motor of the machine.

Upon operation of motor 85, shaft 78 is continuously driven in rotation and rotates cam 77 clockwise as viewed in Fig. 7. During each revolution of cam 77 it elevates link 64, arm 59, and pawl 63 to a position where the latter engages a tooth of ratchet wheel 58 as shown in Fig. 7. As cam 77 continues in its rotation, levers 65, link 64, arm 59, and pawl 63 move downwardly under the tension of spring 74 as roller 76 descends by virtue of the configuration of the edge of cam 77. Such downward movement of pawl 63 rotates sprocket 33 a distance sufficient to cause chains 26 to advance a distance equal to that distance between the centers of the ampoule receptacle blocks 54.

This distance of indexing movement is such that an ampoule which has just been filled by needle 18 at filling station F will be moved out of alignment with said needle and a next adjoining ampoule to the left of said filled ampoule will be brought into alignment with said needle. Concurrently, a sealed ampoule will be removed from sealing station S (Fig. 7) and a filled ampoule brought into sealing position. One revolution of cam 77 is sufficient to cause such indexing movement of conveyor 16.

3. *Ampoule filling mechanism*

Substantially concurrently with a receptacle 54 presenting an ampoule 10 to filling station F, i. e., placing the ampoule in general alignment beneath needle 18 of filling head 19, aligning grippers 17 (Figs. 2 and 11), move from their open position (shown in dot-and-dash lines in these figures) to their closed position (shown in full lines) where they embrace neck 14 of the ampoule to positively center and align its opening coaxially with needle 18.

Grippers 17 (Fig. 11) are pivotally mounted as at 86 to a depending bracket 87 fixed to the machine frame. A pair of horizontally disposed links 88, each pivoted at one of its ends to its corresponding gripper 17 and pivoted at its opposite end to a common disk 89, connects the grippers for uniform, joint, arcuate movement about the fulcrum pivots 86. Disk 89 is fixed on a stub shaft 92 journaled in bracket 87. A spring 93 connected at one end in past-center relation to disk 89 and at its opposite end to a depending extension of bracket 87 normally urges disk 89 in a counterclockwise direction as viewed in Fig. 11 and, through links 88, urges grippers 17 into closed position as shown in full lines in Fig. 11.

An angularly disposed link 94 pivotally connects disk 89 with one arm of a bell crank 95 pivoted at the end of its opposite arm as at 96 to bracket 87. A plunger 97 of a gripper-control solenoid 98 is pivotally connected to bell crank 95 adjacent its fulcrum pivot 96. Upon energization of solenoid 98, plunger 97 is drawn downwardly and, through the linkage just described, disk 89 is rotated against the tension of spring 93 in a clockwise direction a distance sufficient to move grippers 17 into engagement with neck 14 of the ampoule.

Solenoid 98, as will hereinafter be described in detail, is energized immediately following a filling operation, to thus open grippers 17 so that the filled ampoule is free to move with conveyor 16. The solenoid remains energized throughout the indexing movement of the conveyor and becomes de-energized, to permit spring 93 to close grippers 17 on the neck of an ampoule substantially concurrently with the ampoule coming to rest in filling position beneath needle 18.

The mechanism for raising and lowering filling head 19 together with its needle 18 will now be described. The head 19 is supported upon a pair of parallel, vertically disposed rods 99 (Figs. 6 and 11) which are slidably mounted for guided movement in bearings 102 affixed to the machine frame. The lower ends of the rods are connected by a cross strap 103, the center of which rests on the upper surface of an adjusting screw 104, threadably secured in a horizontally disposed angle strip 105. Referring to Fig. 6, strip 105 is secured at its opposite ends as at 106 to the lower ends of vertically disposed racks 107. Referring to Fig. 11, racks 107 are guided for vertical reciprocatory movement between spaced plates 108, there being just sufficient space between the inner surfaces of the plates to permit sliding movement of the racks. Suitable rolls and pinions such as indicated at 109 in Fig. 11 embrace the opposite edges of the racks to maintain them against lateral displacement.

A driving pinion such as 112 (Fig. 11) meshes with the teeth of each rack 107 and is secured on a horizontally disposed shaft 113 extending through both plates 108 and pinion 112. A pinion 114 is secured on the outer end of shaft 113 and meshes with a segmental gear 115 journaled for rotation upon a stub shaft 116 stationarily mounted on the machine frame. A link 117 is secured at one end to segmental gear 115 and, at its opposite end, to a lever 118 pivoted at 119 to the machine frame. A spring 122 connected at one end to lever 118 and anchored at its opposite end to the machine frame constantly urges a roller 123 rotatably mounted on lever 118 against the edge of a cam 124 fixed to a horizontally disposed shaft 125, journaled at its opposite ends in bearings 126 secured to the machine frame. The driven end of shaft 125 (as viewed in Fig. 7) has secured thereon a sprocket 127 (see also Fig. 12) around which passes a chain 128. Chain 128 also passes around a sprocket 129 affixed on a horizontally disposed shaft 132 journaled at its opposite ends in bearings 133 fixed on the machine frame. Additionally, chain 128 passes around a sprocket 134 affixed to a horizontally disposed shaft 135 suitably journaled for rotation on the machine frame.

The right hand end of shaft 135 as viewed in Figs. 7 and 9, enters into a gear housing 136 located at the rear end of the machine and is connected by gearing (not shown) for rotation by shaft 78 which also enters into and is connected with the gearing of housing 136. Referring to Fig. 12, an idler sprocket 137 supported on an adjustable arm 138 tensions chain 128 about sprockets 127, 129, and 134. From the train of shafting and gearing just described, it is seen that upon shaft 78 being driven in rotation by motor 85 as heretofore described, shaft 135 will be driven in rotation in counterclockwise direction as viewed in Fig. 12, and that sprockets 134 and 127 through chain 128 will continuously drive shaft 125 in a counterclockwise direction.

Referring now to Fig. 11, it is seen that cam 124 is rotated by shaft 125 and, by virtue of its engagement with cam roller 123, during each of its revolutions rocks lever 118 first in a counterclockwise direction about pivot 119 and then in a clockwise direction. During the counterclockwise stroke of lever 118, segmental gear 115 is rocked clockwise by link 117 and this in turn, through gears 114 and 112, imparts a movement to racks 107 an extent sufficient to raise the racks and angle strip 105 upwardly to a position where rods 99 and head 19 are elevated to sustain the lower end of needle 18 above the upper end of ampoule 10. During the clockwise stroke of lever 118, segmental gear 115 is rotated in a clockwise direction an extent sufficient to lower racks 107 and strip 105 to the position shown in Fig. 11, wherein rods 99, head 19, and needle 18 are lowered a distance sufficient to cause the needle to enter within the upper end of the ampoule as shown in Fig. 11.

The timing of the movements just described is such that as soon as grippers 17 have embraced neck 14 of an ampoule, the needle is permitted to descend into the ampoule neck. It remains there for a relatively short period of time, but a period sufficient to permit the dispensing of medicament of other liquid into the ampoule, whereupon the needle is forthwith elevated to a position clear of the ampoule as just described, the withdrawal of the needle taking place, of course before movement is imparted to conveyor 16 to index the filled ampoule from the filling station and the next unfilled ampoule into filling position.

Needle 18 is connected by flexible tubing 138 to a metering pump 139. A supply line 142 connects the pump to a suitable source of medicament or other fluid with which the ampoules are to be filled. Pump 139 may be of any suitable type for dispensing an accurate, predetermined dose amount of medicament or other liquid. The pump herein illustrated is of the type which is more fully disclosed in U. S. Patent No. 2,148,899, entitled "Pipetting Machine" and issued to Theodore J. Carski et al. on February 28, 1939. Such a pump includes an electric motor 143, which, upon operating, commences the flow of the liquid and which upon being stopped causes the liquid to cease flow instantly. In this manner a precise quantity of liquid is conveniently and readily dispensed. The means of controlling the starting and stopping of motor 143 will be hereinafter described in conjunction with the wiring diagram shown in Fig. 18. Suffice it now to say that when needle 18 comes to rest within neck 14 of an ampoule 10, motor 143 is started and maintained running for a predetermined period of time sufficient to dispense the desired amount of liquid, and is then shut off preparatory to needle 18 being withdrawn from ampoule 10.

4. *Ampoule filling lockout mechanism*

Mechanism is provided on this machine to prevent lowering of filling head 19 and its needle 18, and to prevent operation of pump 139 when there is no ampoule present in a receptacle 54 when the latter is indexed into filling position beneath needle 18.

This mechanism includes a lockout arm 144 (Fig. 11) pivoted at its lower end as at 145 to a bracket 146 secured to the machine frame. A link 147 pivotally connects arm 144 to one arm of a bell crank 148 pivoted at 149 to bracket 146. Another arm of bell crank 148 is pivotally connected at 152 to a plunger 153 of a solenoid supported on bracket 146. A spring 155 is connected in past-center relation between lockout arm 144 and a third arm of bell crank 148. As long as solenoid 154 remains de-energized, as shown in Fig. 11, the upper end of lockout arm 144 remains out of the path of movement of cross strap 103. Upon energization of solenoid 154, however, plunger 153 is pulled into the solenoid and this rocks bell crank 148 in a counterclockwise direction as viewed in Fig. 11, a distance sufficient to place the upper end of lockout arm 144 into the path of movement of cross strap 103.

A three contact electrical switch 156 (Fig. 11) is affixed to the machine frame in a plane just below the pivot centers of aligning grippers 17.

As will be observed in Fig. 11, the lower end of the left hand gripper 17 has a depending extension 157 that is arranged to engage the control button of the switch. The electrical circuits involved will be more fully described hereinafter in connection with the wiring diagram. Suffice it now to say that upon a receptacle 54 reaching filling position with no ampoule therein, aligning grippers 17 swing further inwardly toward each other than they do normally as when an ampoule is present. When the grippers swing inwardly this further distance, extension 157 operates switch 156 and solenoid 154 is thereby energized to move lockout arm 144 beneath cross strap 103. The timing is such that the lockout arm is moved into blocking position, when filling head 19, rods 99, and cross strap 103 are in their uppermost position and before this unit commences its downward stroke. Hence, when angle strip 105 descends as described in the foregoing, filling head 19 cannot follow, but is maintained in its raised position by lockout arm 144. Upon grippers 17 being released from their closed position, movement of extension 157 permits switch 156 to open and deenergize solenoid 154, whereupon the parts restore to their normal or ineffective positions shown in Fig. 11.

Operation of switch 156 to energize solenoid 154 and actuate lockout arm 144 into lockout position, simultaneously, in a manner which later is more fully explained, opens the electrical circuit of motor 143 and thereby prevents operation of pump 139 and the attendant discharge of liquid during any cycle of the machine wherein the filling head 19 and its needle is withheld from descending into filling position.

5. *Ampoule sealing mechanism*

Upon a filled ampoules reaching sealing position at sealing station S (Figs. 7 and 9), anchoring grippers 21 as shown in Figs. 4 and 13 move into closed position and embrace the constricted portion 12 of the ampoule to anchor the latter securely against upward movement. Grippers 21 are similar to aligning grippers 17, except that they are somewhat shorter in length, so that their upper ends lie in the horizontal plane of constriction 12 instead of in the plane of ampoule neck 14. The mechanism for operating grippers 21 is shown schematically in Fig. 18 and is identical with the link, spring, and disk elements described in connection with the aligning gripper mechanism. The opening and closing mechanism for the anchoring grippers is, however, controlled by a separate solenoid 158 (Fig. 18) similar to solenoid 98 which operates the aligning grippers. Upon an ampoules arriving at sealing position, solenoid 158 is de-energized to permit closing of the anchoring grippers under spring tension upon the constricted portion 12 of the ampoule. Following the removal of the scag end 15 of the ampoule from neck 14, solenoid 158 is energized to move grippers 21 to open position.

Mechanism is provided for raising and lowering heads 24 and 24a to lower their respective tongs 22—22a into embracing position with necks 14 of the ampoules, and to raise the tongs to pull the scag ends 15 from the ampoules. Since the head lowering and raising mechanism is identical for each head except for the fact that the mechanisms are arranged on opposite sides of the machine, only one train of mechanism will be herein described, it being understood that both of the mechanisms operate in the same manner, and are coordinated so that only one of the heads will be lowered into ampoule neck engaging position at any given time. Referring to Fig. 7, this raising and lowering mechanism includes a horizontally disposed angle strip 159 secured at its opposite ends as at 162 to the lower ends of vertically disposed racks 163, thus constituting a lifting and lowering bail.

Referring to Fig. 15, it will be seen that racks 163 are guided for vertical reciprocatory movement between plates 164, with suitable idler rollers and pinions 165 engaging opposite edges of the racks to prevent their lateral displacement. A pinion 166 meshing with rack 163 is fixed to a stub shaft 167 suitably journaled in the rearmost plate 164. The outer, rearmost end of stub shaft 167 has secured thereon a pinion 168 meshing with a segmental gear 169 journaled upon a stub shaft 172. A vertically disposed link 173 is pivotally connected at its lower end as at 174 to gear 169 and at its upper end as at 175 to the outer end of a cam lever 176. Lever 176 is pivoted intermediate its ends on a stub shaft 177 journaled in a depending bearing 178 secured to the machine frame. The inner end of lever 176 has rotatably mounted thereon a roller 179 bearing against the edge of a cam 182 secured to and rotatable with shaft 132. Roller 179 is maintained in engagement with the edge of cam 182 by a coil spring 183 connected at one end to lever 176 and at its opposite end to the machine frame.

As cam 182 is driven in rotation during the machine operation, lever 176 is rocked clockwise about stub shaft 177 against the tension of spring 183. Such clockwise movement of lever 176, through link 173, rocks segmental gear 169 in a clockwise direction about stub shaft 172 and thereby drives pinion 166 in a counterclockwise direction to raise rack 163 and angle strip 159 a predetermined distance. Upon continued rotation of cam 182, roller 179 restores to its original position, as shown in Fig. 15 under the tension of spring 183. During this restoring movement, link 173 rocks segment gear 169 in a counterclockwise direction, and this lowers rack 163 and angle strip 159 back into the position shown in Figs. 13 and 15.

Angle strips 159 are so arranged that their horizontal flanges lie directly beneath weights 184 (see also Fig. 14) associated with the pulling heads 24—24a. Weights 184 are secured to the lower end of a vertically movable frame 185, comprised of spaced plates 186 between which are fixed vertically disposed racks 187, said racks having their teeth facing inwardly toward each other. Racks 187 mesh with pinions 188 rotatably mounted on studs 189 secured in a plate 192 fixed stationarily upon machine frame 27. Pinions 188 mesh with oppositely disposed teeth provided on a rack 193 which passes downwardly between the pinions. The upper end of rack 193 carries a rotatable cap bearing 194 (Fig. 13) upon which rests a horizontally disposed plate 200 fixed on the lower end of a hollow tubular shaft 195. Shaft 195 is mounted for vertical reciprocation and rotative movement within bearings 196 fixed to the machine frame.

The upper end of shaft 195 carries head 24 from which pulling tongs 22 depend. From the foregoing, it is seen that as angle strip 159 is elevated, it moves weights 184 and frame 185 upwardly and that this upward movement rotates pinions 188. Rotation of pinions 188, during the upward stroke of racks 187 pulls rack 193 downwardly into frame 185 as shown on the right hand side of Fig. 13. Incident to the lowering of rack 193, plate 200 and shaft 195 descend by gravity, and in this manner, head 24 and its associated tongs 22 are lowered into position to grip a scag end 15 of an ampoule. Upon angle strip 159 descending to its lowermost position shown in Fig. 13, weight 184 and frame 185 would follow the strip downwardly and immediately raise shaft 195 and head 24, but for the fact that tongs 22 will have seized upon a scag end 15 of an ampoule, so that head 24 and shaft 195 are retained in their lowered positions against the tension exerted by frame 185 and its associated weights 184. In this manner weights 184, are, in effect, cocked to deliver a pulling force upon tongs 22 while neck 14 becomes, in effect, a trigger for releasing the weights, it being remembered that ampoule 10 is anchored by grippers 21 against upward movement.

The mechanism for opening and closing tongs 22 is best shown in Figs. 4 and 13. Tongs 22 are secured to bell cranks 197 pivoted at 198 within head 24. The bell cranks are pivoted together as at 199 for joint movement about their pivots 198. A link 202 pivotally connects one of the bell cranks 197 to a lever 203 pivoted at 204 within head 24. A spring-pulled arm 205 is pivoted within head 24 at 206 and is pivotally connected at its lower end as at 207 to lever 203. By this arrangement the spring-pulled arm 205 urges tongs 22 toward one another into gripping engagement with a scag end 15 of an ampoule. An adjusting screw 208 is provided to regulate the extent of gripping pressure which may be applied by the spring-pulled lever 205. The right hand end of lever 203 is pivotally connected as at 209 to a plunger 212 of a solenoid 213. As will be more fully explained in connection with the wiring diagram, when solenoid 213 is energized, lever 203 is rocked clockwise against the tension of spring-pulled lever 205, about its pivot 204 a distance sufficient to open tongs 22.

Solenoid 213 is energized during the descent of head 24 and is de-energized when head 24 reaches its lowermost position. The solenoid remains de-energized until the head has raised to remove the scag end of the ampoule and swing such removed end over a waste receptacle, whereupon the solenoid is energized and remains so until head 24 is lowered into scag-end gripping position.

Sealing burners 23 (Figs. 4 and 13) are supported on the upper ends of vertically disposed tubes 214 guided for vertical movement in machine frame 27. Tubes 214 are connected adjacent their lower ends by a tie bar 215 to which is attached as at 216 the upper end of a plunger 217 of a burner control solenoid 218 mounted in a depending bracket 219 secured to the machine frame. The lower ends of tubes 214 are connected by flexible tubing 222 to a suitable source of fuel. Springs 223 connected between tie bar 215 and machine frame 27, urge bar 215, tubes 214, and burners 23 upwardly a slight extent, to the position indicated by dotted lines in Fig. 13. Solenoid 218, however, is normally energized as will hereinafter be described in connection with the wiring diagram and, when so energized, pulls burners 23 downwardly to the position shown in full lines in Fig. 13. In such position, the flames from burners 23 jet from opposite directions toward neck 14 of the ampoule. As the flames play upon the neck, the glass or other material from which the ampoule is made is rendered plastic. As soon as the neck becomes sufficiently plastic, tongs 22, head 24, and tubular shaft 195 rise under the force exerted by frame 185 and weights 184, and pull scag end 15 free of neck 14. The fusing of the glass or other material effects a sealing of neck 14 of the ampoule. At this stage, the sealed end of the ampoule would present a sharp point. Since this is undesirable, burners 23 are elevated shortly following the separation of the scag end 15 from neck 14, to their uppermost position shown in dotted lines in Fig. 13. Such raising of the burners causes the sharply pointed end to remain in molten condition and to flow so as to form a rounded end as shown in Fig. 5. The elevation of burners 23 is controlled by a switch 224 (Fig. 13) fixed to a lower portion of the machine frame in spaced relation from weights 184. An arm 225 of switch 224 is arranged to be engaged and moved to effect actuation of the switch by a slightly outwardly projecting control arm 226 affixed to weights 184. When weights 184 descend a predetermined distance, i. e., a distance sufficient to remove scag end 15 from neck 14, arm 226 engages arm 225 and actuates switch 224 to open the electrical circuit of solenoid 218, thus permitting burners 23 to rise as just described.

Following the upward movement of the burners and their being maintained in raised position for a relatively short but sufficient period of time to cause a rounded end to be formed on the neck of the ampoule, solenoid 218 is re-energized to lower burners 23 back into their normal or sealing position. The electrical circuits for solenoid 218 and switch 224 will hereinafter be more fully described in connection with the wiring diagram.

It is to be noted that by the construction and arrangement of parts just described, each ampoule per se controls its particular sealing operation. That is to say, an ampoule having a neck of relatively light wall thickness and/or of a material having relatively low heat resistance will yield and seal somewhat more rapidly than an ampoule having a relatively heavy wall thickness at its neck, and/or of material of relatively high heat resistance and all intermediate degrees of such heat and strength characteristics will lie between these two extremes. By so utilizing the ampoules as an element of the machine in controlling the separation of the scag end 15 from neck 14, a smooth, efficient sealing operation is insured irrespective of variations in the individual ampoules. Breakage of ampoules and other untoward results, caused by prematurely forcing a separation before the neck has reached that temperature necessary in accordance with wall thickness and strength characteristics peculiar to the particular ampoule, are completely eliminated. This results in a marked reduction in both waste operations and waste product.

The mechanism for rotating heads 24 and 24a while in their raised position from over the sealed ampoules through an arc of 180° into position to discharge the removed scag ends 15 into waste receptacles 25 and then back into position over the ampoules will now be described.

Referring to Fig. 7, such mechanism includes a horizontally disposed rack 227 guided for reciprocable movement by rollers such as 228 (see also Figs. 12, 13, and 14) along ways 229 provided on the machine frame. The inner face of rack 227 (Fig. 14) has teeth 233 meshing with a pinion 234 journaled for free rotation about shaft 195 which slidably passes through the pinion. A plate 235 fixed to pinion 234 and also freely rotatable about shaft 195 carries a fixed, depending key 236 which passes with sliding clearance through an aperture 237 in plate 200 which, it will be remembered, is affixed to the lower end of shaft 195. The upper face of rack 227 has teeth 238 meshing with a segmental gear 239 journaled for rotation on a stub shaft 242 fixed to the machine frame. A link 243 pivotally connects gear 239 to the outer end of a lever 244 pivoted on a stub shaft 245 journaled in a depending bearing 246 (Fig. 12) secured to the machine frame.

The opposite end of lever 244 carries a roller 247 bearing against the edge of a cam 248 fixed on shaft 132. A coil spring 249 connected at one end to lever 244 and at its opposite end to the machine frame, constantly urges roller 247 and lever 244 into a following relation with cam 248. As cam 248 is driven in rotation by shaft 132, at the appropriate time in the machine cycle when head 24 has reached its fully elevated position and the scag end 15 has been removed from an ampoule, lever 244 is rocked by cam 248 in a clockwise direction as viewed in Fig. 12 to pull link 243 downwardly and rotate gear 239 to move rack 227 in a direction toward the reader as viewed in this figure. Movement of rack 227 rotates pinion 234 and plate 235 which, through key 236, rotate plate 200 and shaft 195 through an arc of 180° as indicated by the curved arrow at the top of Fig. 14 in connection with head 24a.

Such movement positions the pulling tongs 22 or 22a, as the case may be, over their associated waste receptacles 25. At this time, solenoid 213 becomes energized to open the tongs whereupon the removed scag end 15 drops into the receptacle. Upon further rotation of cam 238, the parts restore to their positions shown in Fig. 12 and thus swing the head back into vertical alignment with the next filled ampoule to be sealed. It will be understood from the figures just referred to that each head 24—24a has its own independent rotating mechanism, that each functions in an identical manner, and that the two heads are coordinated to operate so that when one head is swung out to drop a scag end 15 the other head will be swung in and lowered to engage a scag end 15 of a filled ampoule preparatory to removing said end in the manner hereinbefore described. The timing of the machine is such that a pair of oppositely disposed sealing heads such as 24—24a are utilized for each filling head 19 that is employed and, referring to Figs. 6 and 7, it will be seen that a battery of filling heads 19 may be arranged side by side at the forward end of the machine and a corresponding number of pairs of sealing heads 24—24a may likewise be arranged side by side, along the rear end of the machine.

When four filling heads are employed as suggested by the full and dotted line showings in Fig. 6, three additional ampoule receiving receptacles 54 as indicated by bracket 251 in Fig. 6 are mounted in equispaced relation between the receptacles 54 to increase the capacity of conveyor 16 in correspondence with the increase in number of filling stations F.

The sealed ampoules are discharged from receptacles 54 as the latter turn around sprockets 33 (Fig. 7). The ampoules fall a short distance into an angularly disposed guide chute 250 fixed to the right hand end of machine frame 27 as clearly shown in Fig. 7. Chute 250 carries the finished ampoules into a suitable receptacle (not shown).

The various solenoids 98, 154, 158, 213, 218 and pump motor 143 are, in part at least, controlled by electrical cam controlled contacts to be hereinafter described in connection with the wiring diagram. The cams for controlling the opening and closing of the contacts are affixed to a horizontally disposed shaft 252 (Figs. 6, 8, and 11) suitably journaled at its opposite ends in bearings such as 253 (Fig. 6). Shaft 252 is continuously driven in rotation by a chain and sprocket drive 254, the chain passing around a sprocket 255 fixed to shaft 125. By this means, when the main drive motor 85 is operating, shaft 252 is continuously driven in rotation and thereby rotates the cams affixed thereon to perform functions described in the section which follows.

6. Electrical circuits

The machine is started by closing a main line switch 256 (Fig. 18) which closes the circuit to the main drive motor 85 wired in series between lines 257 and 258.

Aligning gripper solenoid 98 and anchoring gripper solenoid 158 are connected directly to side 257 of the line and are controlled by a pair of normally closed cam contacts 259 operated by a cam 260 on shaft 252. When ampoules 10 reach filling station F and sealing station S, respectively, contacts 259 are opened by cam 260 so that solenoids 98 and 158 are de-energized and their respective grippers 17 and 21 are closed by their associated springs such as 93. Following a completion of a filling and sealing operation, contacts 259 are closed to energize solenoids 98 and 158 to open the aligning and anchoring grippers 17—21.

When filling head 19 lowers needle 18 into an ampoule as shown, pump motor 143 is operated through the following circuit. One side of motor 143 is connected to line 257 and the opposite side of the motor is wired in series through a pair of cam contacts 262 and a pair of normally closed contacts 263 of the three contact switch 156 of the other side 258 of the line. Contacts 252 are controlled by a cam 264 on the shaft 262. When cam 264 closes contacts 262, motor 143, is started to operate pump 139. Upon the opening of contacts 262 the motor circuit is broken and the motor and pump are thereby stopped. This dispenses a predetermined quantity of liquid into ampoule 10.

Lockout solenoid 154 is connected to side 257 of the line and to a normally opened contact 265 of three contact switch 156. When no ampoule is present beneath needle 18, aligning grippers 17 swing further inwardly than normal as heretofore described. Such further inward movement actuates switch 156 to move the center strap contact 263 out of engagement with its companion contact 263 into engagement with contact 265 thus energizing solenoid 154 to move lockout arm 144 into effective position as shown in dotted lines. Opening of contacts 263 prevents operation of motor 143 and pump 139 even though contacts 262 are closed during a portion of a machine cycle wherein no ampoule is present beneath filling needle 18.

Pulling-tong solenoid 213 is connected to side 257 of the line and through a pair of normally open contacts 266 of a control relay 267 is connectable with the opposite side 258 of the line. The coil of relay 267 is connected to side 257 of the line and, through normally open contacts 268, to the side 258 of the line. Contacts 268 are controlled by a cam 269 on shaft 252. When cam 269 closes contacts 268, relay 267 becomes energized and closes its normally open contacts 266 to thus energize solenoid 213 and open tongs 22. When tongs 22 have been lowered to embracing position with respect to an ampoule 10 as shown in Fig. 18, cam 269 opens contacts 268. This deenergizes relay 267, thereby opens relay contacts 266, and thus de-energizes solenoid 213 to permit tongs 22 to close upon the ampoule neck under the tension of spring-pulled lever 205.

Burner solenoid 218 is connected directly to side 257 of the line and is connected through normally closed points 272 of a relay 273 to the opposite side 258 of the line. Hence, solenoid 218 is normally energized to hold burners 23 in their lowermost position. Relay 273 is connected directly to side 257 of the line and, through normally open contacts 274 of switch 224 and normally closed cam contacts 275 to the opposite side 258 of the line. Contacts 275 are controlled by a cam 279 on shaft 252. A pair of normally open holding points 276 of relay 273 are connected through the relay coil to side 257 of the line and through a pair of cam contacts 277 to the opposite side 258 of the line. Contacts 277 are controlled by a cam 278 on shaft 252. As control arm 226 actuates switch 224 as weights 184 descend, contacts 274 are momentarily closed. Such closing of contacts 274 energizes relay 273 and opens relay points 272 whereupon solenoid 218 is de-energized to permit burners 23 to raise to their upper position. Holding points 276 hold relay 273 energized until cam 278 opens contacts 277 thereby breaking the circuit of relay 273 and re-energizing solenoid 218 to lower burners 23 into their lowermost position. The burners 23 are maintained in their uppermost position only for a sufficient period of time to effect a rounding off of the sealed ampoule end as shown in Fig. 5.

Preparatory to and during the upstroke of weights 184 and frame 185, cam 279 opens and maintains contacts 275 open so that even though control arm 226 momentarily engages arm 225 of switch 224 to close its contacts 274, relay 273 remains deenergized. Hence the circuit of relay 273 cannot be completed and burners 23 therefore remain in their lowermost position while weights 184 and frame 185 are cocked in elevated position by pulling tongs 22 grasping the neck 14 of an ampoule.

The term "ampoule-controlled sealing means" as hereinafter used in the claims means a sealing means, the operation of which is controlled at least in part by the wall thickness, heat resistance, and general physical characteristics of the glass or other material from which an ampoule is fabricated.

While the form of mechanism herein shown and described is admirably adapted to fulfill the objects primarily stated it is to be understood that it is not intended to confine the invention to the one form of embodiment herein disclosed for it is susceptible of embodiment in various forms all coming within the scope of the claims which follow.

I claim:

1. A mechanism for sealing an ampoule having a scag end, neck, and body portion, said mechanism including anchoring grippers for securing the body portion, burner means for playing a flame upon said neck portion, pulling tongs movable into position to embrace said scag end, and weight means associated with said pulling tong means in such manner as to cause the weights to be cocked to impose a pulling action on said tongs upon the latter being brought into embracing position with respect to said scag end whereby upon the material of the ampoule being rendered sufficiently plastic by the flame of said burner, said scag end is forthwith separated from said neck and the latter forthwith and thereby sealed in accordance with its peculiar strength and heat resistance characteristics.

2. In an ampoule filling and sealing machine, a filling station, a sealing station spaced from said filling station, a line conveyor having receptacles for receiving ampoules and operable to rectilinearly advance and index the ampoules successively to said filling and sealing stations, a reciprocable filling head at said filling station movable into and out of filling association with an indexed ampoule, aligning grippers at said filling station operable to grip and align an ampoule preparatory to said filling head being moved into filling association therewith and to release said ampoule following a filling operation and preparatory to an indexing movement of the ampoule by said conveyor, anchoring grippers at said sealing station operable to grip a body portion of an ampoule to retain the ampoule body against movement, reciprocably movable weight means, pulling tongs associated with said weight means operable to grip another portion of said ampoule and thus place an intermediate portion of the ampoule lying between said two first named portions under the stress of force applied by said weights, and burner means at said sealing station arranged to play a flame upon said intermediate portion which latter, upon becoming sufficiently plasticized by said flame, yields and permits a relatively rapid separation of said pulling-tong-gripped portion from said body portion under the force exerted by said weights whereby said body portion is sealed in accordance with its peculiar wall thickness and strength characteristics.

3. In a machine of the class described, ampoule sealing mechanism comprising anchoring grippers operable to secure the body of an ampoule, a reciprocably movable and rotatable sealing head having tongs positionable to grip a scag end of the ampoule, weight means associated with said head in such manner as to impart a pull thereon when said tongs are positioned to grip said scag end, burner means for heating said ampoule at a neck portion thereof between said anchoring grippers and said tongs to thereby soften the neck and effect separation of said scag end from said body, means for rotating said head a predetermined distance to remove the separated scag end from over the ampoule, and the means for opening said tongs to release said scag end when said head has been so moved.

4. In a machine of the class described; conveyor means for receiving and moving ampoules along a rectilinear path; sealing means including anchoring grippers for securing the body of an ampoule, pulling tongs for grasping a scag end of the ampoule, and reciprocable burner means movable from one position to another; said burner means being arranged in said one position to play a flame upon a neck portion of the ampoule lying between said scag end and said body portion to soften and fuse said neck portion; weight means associated with said pulling tongs operable to permit separation of said scag end from said body portion upon said neck portion being rendered sufficiently plastic as it reaches fusing temperature; and means under the control of said weight means for moving said burner to said other position substantially concurrently with said separating operation wherein said burner maintains the tip of the ampoule in molten condition for a period of time sufficient to cause said end to become rounded.

5. In a machine of the class described, ampoule sealing mechanism comprising anchoring grippers positionable to secure the body of an ampoule, a movable sealing head having tongs positionable to grip a scag end of the ampoule, weight means associated with said head in such manner as to place a constant tensile stress thereon when said tongs are positioned to grip said scag end and thereby place a constant tensile stress upon a portion of said ampoule lying intermediate said body and said scag end, and burner means for heating said ampoule at said intermediate portion sufficiently to fuse and directly seal said portion concomitantly upon said scag end being drawn and separated therefrom under the tension exerted by said weight means whereby said ampoule is sealed in accordance with and solely under the control of the peculiar wall thickness and strength characteristics of the particular ampoule being sealed.

References Cited in the file of this patent

UNITED STATES PATENTS

| Number | Name | Date |
| --- | --- | --- |
| 1,918,118 | Marzocchi | July 11, 1933 |
| 2,162,464 | Soderberg | June 13, 1939 |
| 2,295,034 | Geiger et al. | Sept. 8, 1942 |
| 2,367,085 | Barker | Jan. 9, 1945 |
| 2,406,101 | Pipping | Aug. 20, 1946 |
| 2,530,230 | Cozzolli | Nov. 14, 1950 |

FOREIGN PATENTS

| Number | Country | Date |
| --- | --- | --- |
| 671,056 | Germany | Jan. 12, 1939 |